E. & T. G. LINDERME.
COVER PLACING MACHINE FOR BOTTLES.
APPLICATION FILED JULY 28, 1916.

1,294,495.

Patented Feb. 18, 1919.
5 SHEETS—SHEET 1.

Witness
Chas. W. Stauffiger
Karl N. Butler

Inventor
Emil Linderme,
Theodore G. Linderme,
By
Attorneys

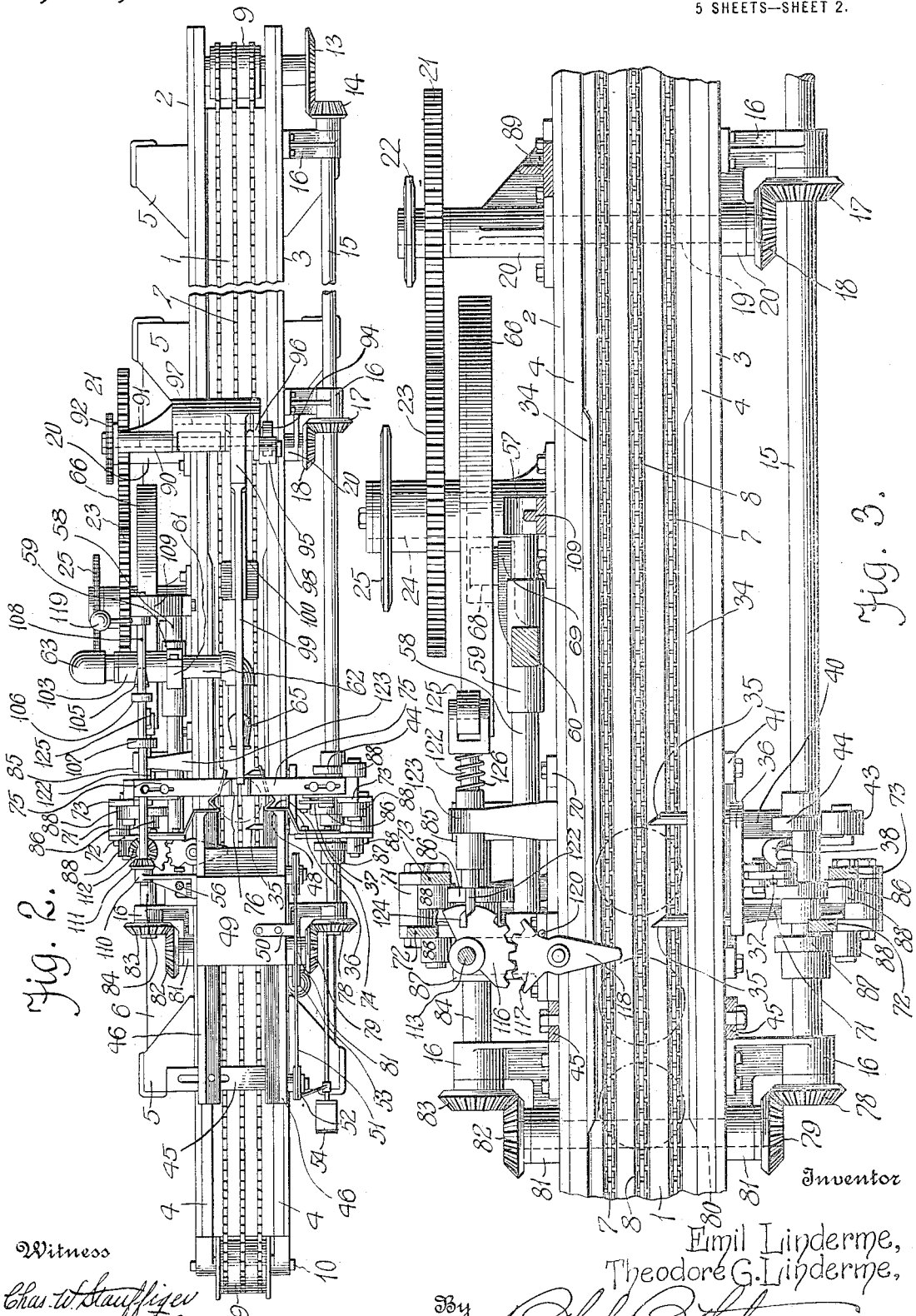

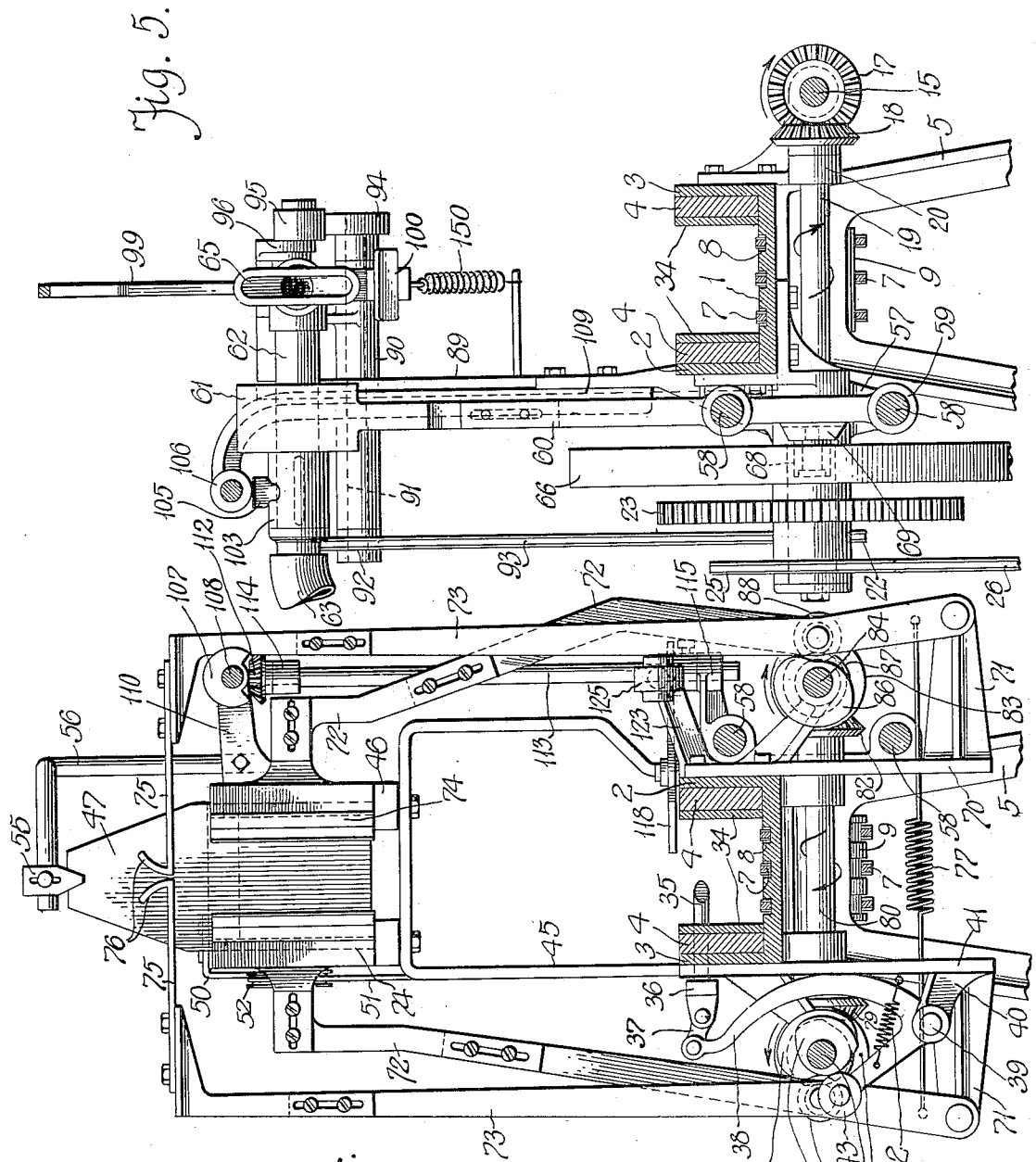

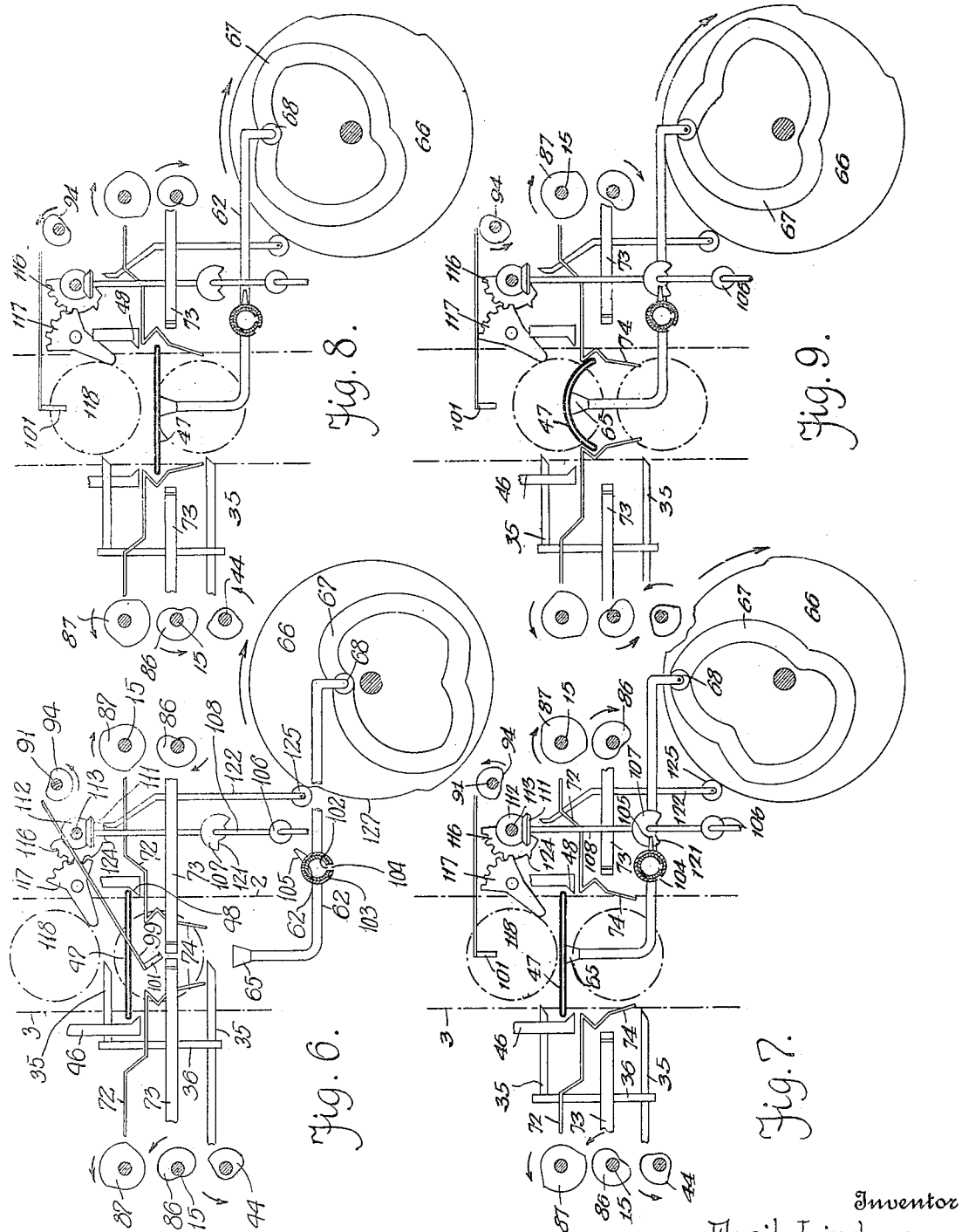

E. & T. G. LINDERME.
COVER PLACING MACHINE FOR BOTTLES.
APPLICATION FILED JULY 28, 1916.
1,294,495.
Patented Feb. 18, 1919.
5 SHEETS—SHEET 5.
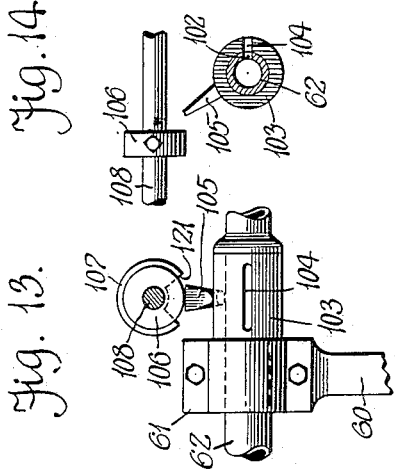
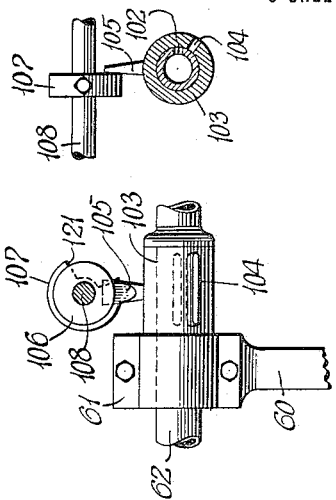
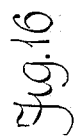
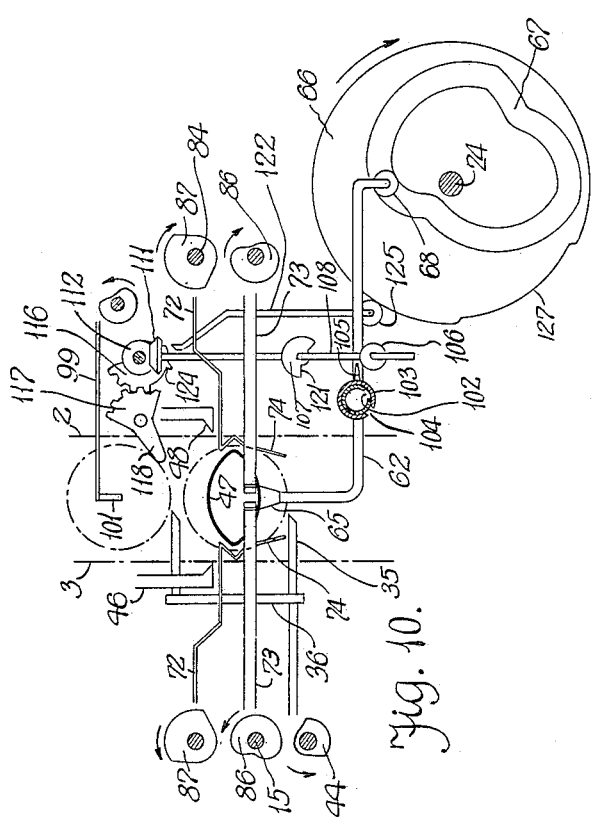
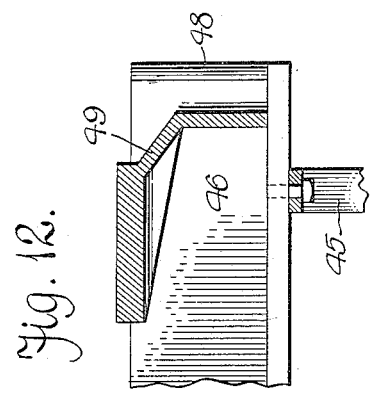
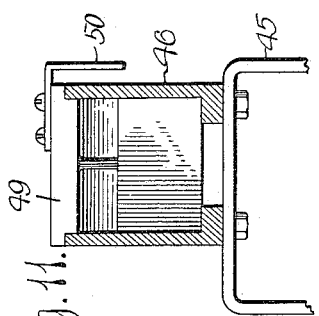
Witness
Chas. W. Stauffiger
Karl H. Butler
Inventor
Emil Linderme,
Theodore G. Linderme,
By
Attorneys

UNITED STATES PATENT OFFICE.

EMIL LINDERME AND THEODORE G. LINDERME, OF DETROIT, MICHIGAN.

COVER-PLACING MACHINE FOR BOTTLES.

1,294,495.  Specification of Letters Patent.  Patented Feb. 18, 1919.

Application filed July 28, 1916. Serial No. 111,841.

*To all whom it may concern:*

Be it known that we, EMIL LINDERME and THEODORE G. LINDERME, citizens of the United States of America, residing at Detroit, in the county of Wayne and State of Michigan, have invented certain new and useful Improvements in Cover-Placing Machines for Bottles, of which the following is a specification, reference being had therein to the accompanying drawings.

Bottles of various sizes adapted as containers for beverages, chemicals, pharmaceutical preparations and other liquids are often provided with packing covers, wrappers or inclosing shields, and it is the present practice to cover or wrap such bottles by hand, necessitating considerable labor and expense.

This invention aims to accomplish in an expeditious and economical manner, by machinery, what has heretofore been performed by hand, and the machines as now placed upon the market are what we believe to be the first to satisfactorily accomplish certain results which have heretofore been considered practically impossible by machinery.

Our machine is commonly styled a cover placing machine as it automatically extracts a cover from a magazine, opens the cover, and places the same upon a bottle. To do this in an efficient manner, there is necessarily present coöperative devices or instrumentalities that will render the machine practically "fool proof," that is, it is impossible for the machine to become choked either with bottles or covers, and the various steps involved in the manipulation of the cover are so timed that even carelessness on the part of the machine attendant will not materially interfere with the output of the machine.

The invention in its broadest aspects involves positive and reliable means for gripping and opening a collapsed cover and then placing the same upon a bottle automatically fed and correctly positioned to receive the cover. Such means includes structural elements which have been combined to provide a durable, easily adjusted, and accurately controlled machine and the principal elements of the invention—namely, machine bed and bottle conveyer, bottle positioning device, cover magazine and covers, suction head and its operating mechanism, cover forming and gripping arms and the operating mechanism thereof, cover setting members and the operating mechanism thereof, and the automatic control device for the suction head—will be hereinafter separately and specifically described in detail, together with the novel arrangement and objects accomplished by such combination of elements.

Reference will now be had to the drawings, wherein—

Fig. 2 is a plan of the same;

Fig. 3 is an enlarged plan of the central portion of the machine, partly broken away and partly in section;

Fig. 4 is a cross sectional view of the machine taken on or about the line IV—IV of Fig. 1, looking in the direction of the arrows at said line;

Fig. 5 is a similar view taken on or about the line V—V of Fig. 1, looking in the direction of the arrows at said line;

Fig. 6 is a diagrammatic view illustrating coöperating devices for manipulating a cover, and showing the devices in relative position, after a cover has been placed upon a bottle;

Fig. 7 is a similar view showing the first step of manipulating a cover, that of removing the same from a magazine;

Fig. 8 is a similar view showing the second step of manipulating the cover, that of gripping the edges thereof prior to forming the cover;

Fig. 9 is a similar view illustrating a third step of manipulating a cover, that of forming or bowing the cover prior to opening the same;

Fig. 10 is a similar view showing the step of opening the cover preparatory to placing the same upon a bottle;

Fig. 11 is a cross sectional view of a cover magazine;

Fig. 12 is a longitudinal sectional view of a portion of the same;

Fig. 13 is a side elevation of an atmospheric valve forming part of a suction head and its operating mechanism, showing the main trip for the valve;

Fig. 14 is a cross sectional view of the atmospheric valve;

Fig. 15 is a side elevation of the atmospheric valve as closed, showing its relation to an emergency trip; and Fig. 16 is a cross sectional view of the same.

Figure 1:
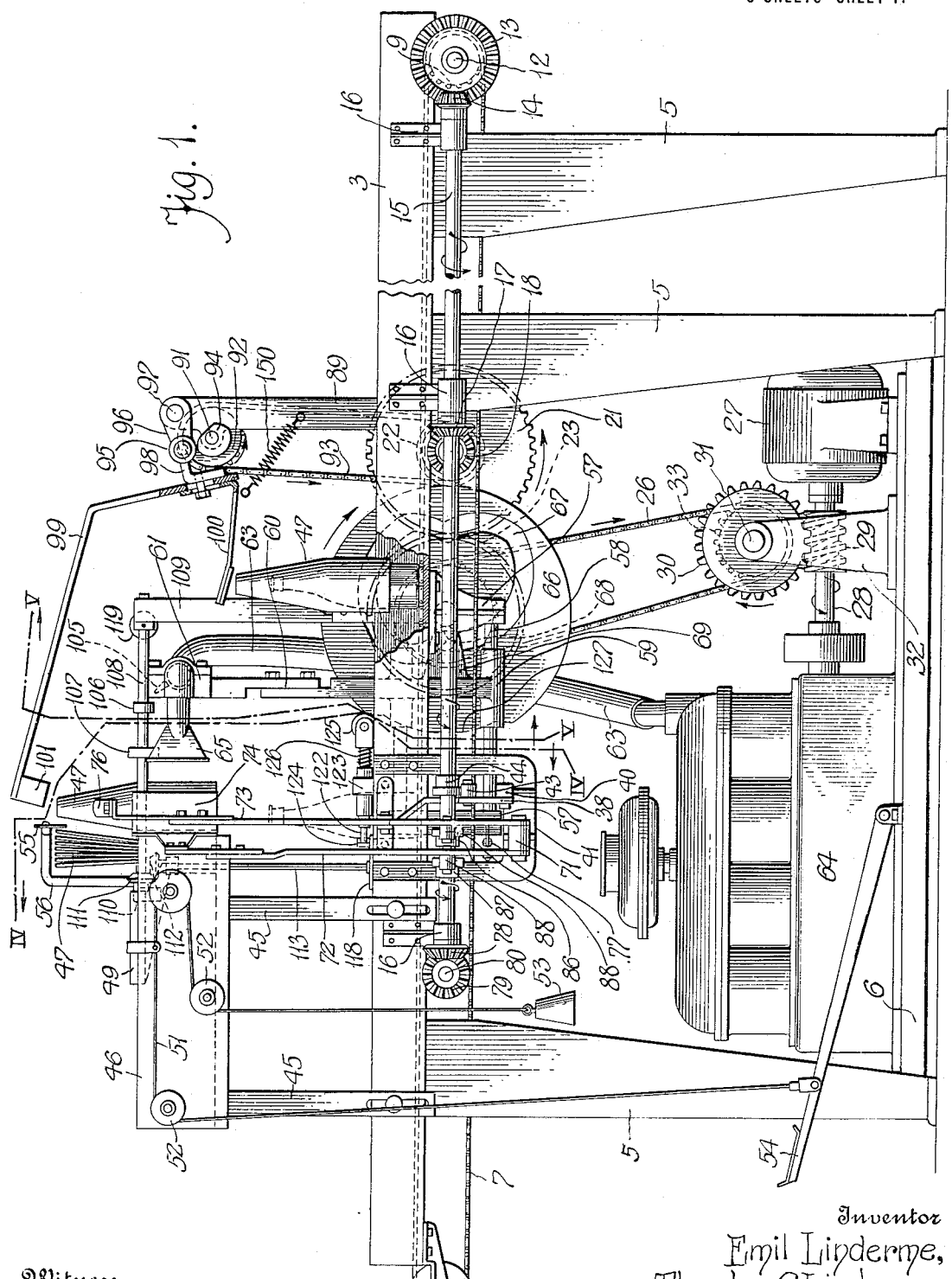
Figure 1 is a side elevation of the bottle cover placing machine, partly broken away.

In describing our invention by aid of the views above referred to, we desire to point out that the same are merely illustrative of the cover placing machine as now manufactured, and we do not care to confine our invention to the precise construction and arrangement of parts shown. The following description is therefore to be broadly construed as including substitute constructions and arrangements of parts.

Considering the machine under the various captions previously mentioned, reference will first be had to the machine bed and bottle conveyer best shown in Figs. 1 to 5 inclusive. The bed of the machine is in the form of a large channel bar or trough having a bottom 1 and opposed parallel side walls 2 and 3, said walls having linings 4 of wood or a yieldable material to prevent bottles or other receptacles from being injured or broken by contacting therewith. The trough is supported at a convenient height by suitably spaced legs or A frames 5, some of which are connected by a platform 6.

Movable throughout the length of the trough is a bottle carrier or conveyer, preferably in the form of a plurality of sprocket chains 7 extending through grooves 8 in the bottom 1 of the trough. The sprocket chains 7 are endless and are trained over multiple sprocket wheels 9 mounted upon shafts 10 and 12 journaled in suitable bearings at the ends of the trough. One end of the shaft 11 has a beveled gear wheel 13 and enmeshing therewith is a small beveled gear wheel 14 on a longitudinal shaft 15, journaled in bearings 16, carried by the side wall 3 of the trough. The shaft 15, intermediate the ends thereof, has a beveled gear wheel 17 meshing with a similar wheel 18 mounted upon the end of a transverse shaft 19, journaled in bearings 20, carried by the trough. The opposite end of the shaft 19 has a gear wheel 21 and a sprocket wheel 22, said gear wheel meshing with a similar wheel 23 rotatable upon a stud shaft 24 projecting from the wall 2 of the trough. Rotatable with the gear wheel 23 is a sprocket wheel 25 and trained over said sprocket wheel is a sprocket chain 26 driven from a power plant upon the platform 6. The power plant consists of an electric motor 27 which has the armature shaft 28 thereof provided with a worm 29, said worm meshing with a worm gear 30 mounted upon the shaft 31, journaled in a standard 32 carried by the platform 6. Sprocket chain 26 is trained under a sprocket wheel 33 mounted upon the shaft 31.

With the electric motor 27 supplied with energy from a suitable source of electrical power, the bottle conveyer or carrier can be continuously operated. The sprocket chains are arranged close enough to substantially support bottles of various sizes in upright position. The trough is of sufficient length to permit of bottles being placed in the forward end thereof, conveyed through the central portion of the trough and delivered at the rear end thereof, the central portion of the trough having additional liners 34 to assist in properly guiding and positioning bottles.

*Bottle positioning device.*

The side wall 3 of the machine trough is provided with openings for reciprocable positioning fingers 35 adapted to extend into the trough, as best shown in Figs. 3 and 4. These fingers have the inner ends thereof beveled to engage and correctly position a bottle to receive a cover, and the outer ends of said fingers are connected to a cross head 36. The cross head 36 is connected by a link 37 to the upper end of a bell crank 38 and said bell crank is fulcrumed, as at 39, upon a bracket 40 carried by a depending U-shaped frame 41 of the trough wall 3. The short arm of the bell crank 38 is connected by a coiled retractile spring 42 to the frame 41 and the end of said arm has a roller 43 held normally in engagement with a cam 44 on the shaft 15. The cam 44 is shaped and positioned on the shaft to move the positioning fingers 35 in timed relation to other instrumentalities of the cover placing machine.

*Cover magazine and covers.*

Contiguous to the forward end of the machine, the walls 2 and 3 of the trough are provided with adjustable frames 45 and mounted upon these frames is a box like cover magazine 46 for folded or collapsed covers 47. The ends of the magazine are open and at the inner end thereof the side walls have beveled inwardly projecting flanges 48. Coöperating with these flanges in holding the covers 47 in upright positions at the inner end of the magazine is a follower 49 fitted between the side walls of the magazine and slidable upon the upper edges thereof, as best shown in Figs. 11 and 12. The follower 49 has a side arm 50 and attached thereto is a cable 51 trained over sheaves 52 supported by the side wall of the magazine. One end of the cable 51 has a weight 53 and the opposite end of the cable is attached to a treadle 54 pivoted upon the platform 6. The treadle 54 permits of the follower 49 being retracted when it is desired to place covers in the magazine, and the weight 53 tends to move the follower 49 toward the inner end of the magazine and covers toward the flanges 48. The covers are furthermore held at the flanges 48 by an adjustable detent 55 on an overhanging bracket 56 supported from the magazine 46.

The machine herein described has been especially designed for placing packing covers upon bottles, and the covers 47 are made from a single piece of durable paper or material cut and shaped to form a cover having open ends, the upper end of the cover being frusto-conical shaped or contracted to snugly embrace the breast and neck of a bottle. The covers when collapsed, are flat and can be easily stacked, on edge, in the magazine 46.

*Suction head operating mechanism.*

The machine trough has suitable brackets 57 for parallel guide rods 58 and slidable on these rods are the sleeves 59 of an extensible upright 60. The upper end of the upright 60 has a bearing 61 for a transverse pipe 62 which has the outer end thereof provided with a hose or flexible connection 63 to a vacuum pump 64 on the platform 6, said pump being operated by the armature shaft 28 of the electric motor 27, as best shown in Fig. 1. The inner end of the pipe 62 has an elbow connection supporting a vertically disposed suction head 65 and by shifting the sleeve 59 of the upright 60 on the guide rods 58 the suction head 65 can be moved to and from the inner end of the magazine 46.

The means employed for reciprocating the suction head 65 consists of a large cam wheel 66 mounted for rotation with the gear wheel 23 and the inner face of said cam wheel has a cam groove 67 into which extends a roller 68 on the side extension 69 of the upright 60. The cam groove 67 is shaped and of such contour as to move the upright 60 and the suction head 65 thereof, to manipulate a cover, in timed relation to other operations performed in connection with the machine.

*Cover forming and gripping arms and the operating mechanism thereof.*

Opposite the depending U-shaped frame 41 of the trough wall 3 is a similar frame 70 of the trough wall 2 and these frames are provided with brackets 71 to which are pivotally connected the lower end of a set of extensible forming arms 72 and the lower ends of a set of extensible gripping arms 73. The arms 72 have the upper ends thereof provided with adjustable formers 74 movable to and from each other in front of a cover magazine 46, said formers being substantially V-shaped in cross section. The upper ends of the arms 73 are provided with adjustable grippers 75 movable to and from each other with the confronting ends of said grippers bent outwardly, as at 76, to form a guide.

The arms of each set are connected by coiled retractile springs 77 and these springs retain the arms in retracted or closed position.

To move the sets of arms 72 and 73 and separate the formers and grippers thereof, cams are employed and derive their power from the longitudinal shaft 15 of the machine. This shaft has the forward end thereof provided with a beveled gear wheel 78 in mesh with a similar wheel 79 on a transverse shaft 80, journaled in bearings 81, supported from the walls 2 and 3 of the machine trough. The opposite end of the shaft 81 has a beveled gear wheel 82 in mesh with a similar wheel 83 on a longitudinal shaft 84, journaled in the bearing 81, of the trough wall 2 and a bearing 85 at the same side of the machine. On the shafts 15 and 84 are a set of cams 86 for the gripping arms 73 and a set of cams 87 for the forming arms 72, all of said cams engaging rollers 88 on the sides of said arms.

The formers 74 are shaped to coöperate with the suction head 65 in opening a cover and the grippers 75 are adapted to hold the opened cover and prevent its collapse until placed upon a bottle as will appear in the general operation of the machine.

*Cover setting members and the operating mechanism thereof.*

The trough wall 2, adjacent the gear wheel 21, has an upright 89 provided with a transverse bearing 90 for a shaft 91. On the outer end of the shaft 91 is a sprocket wheel 92 in vertical alinement with the sprocket wheel 22 whereby a sprocket chain 93 may rotate the shaft 91 in synchronism with the gear wheel 21. The inner end of the shaft 91 has a cam 94 engaging a roller 95 on a crank 96 of the rock shaft 97, said rock shaft being journaled in the upper end of the upright 89. The rock shaft 97 has another crank 98 and connected thereto is a delivery arm 99 and a tapper arm 100. The delivery arm 99 extends in proximity to the adjustable detent 55 and has a tapered member 101 adapted to pass between the grippers 75, remove a cover from engagement therewith and deliver the cover on to a bottle positioned in the machine trough. The cover is placed over the bottle, but not completely seated thereon, and after the bottle moves a prescribed distance in the machine trough, the tapper arm 100 impinges upon the upper end of the cover and completes the placing of the cover upon the bottle.

To hold the roller 95 normally engaging the cam 94, a coiled retractile spring 150 connects the tapper arm 100 to the upright 89.

*Automatic control device for the suction head.*

Controlling the suction in the head 65 or a reduction of atmospheric pressure by the vacuum pump 64, is an atmospheric valve associated with the pipe 62 as best shown in Figs. 13 to 16 inclusive. The pipe 62 has a slot or oblong port 102 and rotatable upon the pipe 62 is a sleeve 103 having a slot or port 104 adapted to register with the port 102. The sleeve 103 has a radially disposed arm 105 and this arm is in the path of a main trip 106 and an emergency trip 107, both of which are upon a longitudinally disposed rock shaft 108. The rock shaft 108 is supported by an extensible upright 109, carried by the trough wall 2, and by a bracket 110 projecting from the cover magazine 46. On the forward end of the rock shaft 108 is a small beveled gear wheel 111 meshing with a similar wheel 112 on a vertically disposed shaft 113 journaled in bearings 114 and 115, the former being part of the bracket 110 and the latter part of the frames 70 carried by the trough wall 2. Adjacent the lower end of the shaft 113 is a sector gear 116 meshing with a similar gear 117 forming part of a horizontally disposed detent 118, pivoted upon the upper edge of the trough wall 2, and projecting into the path of bottles moved in said trough.

At the rear end of the longitudinal shaft 108 is a small weighted crank 119 and this weighted crank, through the medium of the shafts 108 and 113, holds the detent 118 normally projecting over the trough wall 2 with the sector gear 117 against a stop 120 adjacent the pivot of the detent. With the weighted crank 119 holding the rock shaft 108 in this position, the emergency trip 107 provides clearance for the arm 105 by reason of a recess or cut away portion 121 of said trip, and the cut away portion thereof is essential as will hereinafter appear.

Associated with this controlling device is a locking device, comprising a reciprocable plunger 122 carried by a bracket 123 projecting from the wall 2 of the trough. The forward end of the plunger 122 is adapted to engage a beveled lug 124 on the sector gear 116 and the opposite end of said plunger is provided with a roller 125 to engage the periphery of the large cam wheel 66. A coiled compression spring 126 holds the roller 125 normally in engagement with the cam wheel and the periphery of said cam has a cam surface 127 allowing the plunger 122 to shift and release the lug 124 of the sector gear 116.

*General operation.*

When the electric motor 27 is placed in operation, the vacuum pump 64 receives air from the atmosphere by reason of the ports 102 and 104 registering, as shown in Fig. 14, consequently there is no reduction of atmospheric pressure in the suction head 65. The longitudinal shafts 15 and 84 are driven and as the conveyer or carrier is moved in the trough, bottles placed in an upright position in the forward end of the trough are carried along on the sprocket chains 7. The foremost bottle will impinge against the detent 118, but the sprocket chains 7 will slide beneath the bottle, unless the sector gear 116 is released by the plunger 122, which must recede once in each revolution of the large driven cam wheel 66. One revolution of this cam wheel represents the cycle of the machine, that is, the placing of a cover upon a bottle. It is apparent that the suction head 65 will be reciprocated, the cover forming, tripping and setting members and arms oscillated, but so long as the suction head 65 is in communication with the atmosphere, a cover 47 will not be removed from the magazine, consequently there is no danger of a cover being manipulated unless a bottle is actually in position to receive the same. This avoids any clogging of the machine with covers or waste of covers due to bottles not being fed into the machine with sufficient rapidity to receive the cover.

Thus the suction head 65 is reciprocated, and it is apparent that the trip arm 105 would impinge against the trip 107 and close the atmospheric valve, but the shafts 113 and 108 are locked against rocking by the plunger 122 engaging the lug 124 of the sector gear 116 and with these shafts locked, the recess or cut away portion 121 of the trip 107 provides clearance for the trip arm 105, consequently said arm is not moved to close the atmospheric valve.

Assuming that the roller 125 rides into contact with the cam surface 127, then the plunger 122 releases the sector gear 116. The bottle engaging the detent 118 swings said detent in a lateral plane and imparts a rocking movement to the shafts 113 and 108. The bottle is carried past the detent and is engaged by the positioning fingers 35, these fingers having been actuated by the bell crank 38 and the cam 44 of the shaft 15. The positioning fingers 35 correctly locate the bottle to receive a cover, and during this interim, the shaft 108 has been rocked and moved a solid portion of the trip 107, into the path of the trip arm 105.

As the suction head 65 is being reciprocated through the medium of the roller 68 engaging in the cam groove 67 of the cam wheel 66, a movement of the suction head toward the cover magazine causes the trip arm 105 to ride under the trip 106, and just before the suction head 65 reaches a cover in the magazine 46, the trip arm 105 impinges against the trip 107, thereby closing the atmospheric valve and exhausting air from the suction head 65. A cover 47 is gripped by the suction head 65 and removed from the magazine 46 and from beneath the detent 55. The folded or collapsed cover is carried to the position shown in Fig. 8 and by this time, the cover forming arms 72 are being actuated by the cam 86 to close in on the side edges of the cover. As soon as the formers 74 of said arms engage the side edges of the cover, the suction head 65 is moved toward the magazine 46, bowing the cover, as best shown in Fig. 9. It is to be noted that the atmospheric valve is still closed and that the suction head 65 still has a grip upon the cover.

While the forming arms are holding the edges of the cover, the suction head 65 moves forwardly and opens the cover, as shown in Fig. 10. The front of the cover is moved away from the bowed back thereof and before the suction head 65 releases the cover or even the formers 74, the grippers 75 of the arms 73 are brought into action to grip the upper end of the open cover and thereby hold the cover open for further use.

As soon as the grippers 75 hold the open cover, the suction head 65 moves sufficiently to cause the trip arm 105, which has been placed in an upright position by the trip 107, to impinge against the trip 106, consequently the atmospheric valve is opened and the cover released by the suction head. With the cover held by the grippers 75, the delivery arm 99 is brought into action by the member 101 thereof, swinging downwardly to impinge upon the upper end of the cover as held by the grippers. The member 101 forces the cover out of engagement with the grippers 75 and downwardly on to the bottle held in position by the fingers 35. By this time another bottle is actuating the detent 118 during a second cycle of the machine and eventually the bottle which has received a cover reaches a position beneath the tapper arm 100, said arm further seating the cover 47 upon the bottle. Covered bottles are carried forward and may be easily removed from the machine trough.

Figs. 6 to 10 inclusive illustrate relative positions of the various devices during a cycle of the machine, and the cams and cam grooves are of such design that all of the devices are actuated in timed relation to expeditiously and safely manipulate a cover and place the same upon a bottle. Since that part of the machine above the bed or trough thereof can be raised and lowered, bottles of various heights can be placed in the machine and covered.

From the foregoing it will be observed that mechanical and pneumatic or vacuum means are employed for moving and opening a collapsed cover, and that the operation of the pneumatic means is controlled to the extent that if a bottle is not in position, the pneumatic means continues to draw from the atmosphere, and cannot move a cover. Furthermore, a bottle even though in position cannot establish a cover suction of the pneumatic means out of its order or cycle of operation, consequently, there is a coöperation of the various devices of the machine which insures an uninterrupted operation of the machine.

What we claim is:—

1. In a machine, means for manipulating collapsed bottle covers, comprising means for bringing pressure to bear upon the side edges and one face of the cover to bow the cover, and means for moving one bowed face of the cover to open the cover relative to the other bowed face thereof.

2. In a machine for manipulating collapsed bottle covers, comprising means for engaging the side edges of a cover, means for bringing pressure to bear upon the face of said cover to bow the cover during the operation of said cover engaging means, means for moving said pressure means independent of the cover engaging means, and suction means operable during the last mentioned movement of said pressure means to open said cover.

3. In a machine, means for manipulating collapsed bottle covers, comprising means for engaging the side edges of a cover, means for bringing pressure to bear upon the face of said cover to bow the cover, means for moving said pressure means independent of said cover engaging means, suction means to open said cover, and means for holding said cover opened when released by said cover engaging and pressure means.

4. A cover manipulating machine for bottles, comprising a bottle carrier, a magazine for collapsed covers, reciprocable suction means adapted for removing and opening a cover, valvular means controlling the operation of said suction means, bottle actuated means controlling the operation of said valvular means, and locking means for said bottle actuated means adapted to be released in timed relation to the reciprocation of said suction means.

5. Mechanical and pneumatic means for moving and opening collapsed covers, comprising a constantly reciprocated suction head having its source of suction normally in communication with the atmosphere and adapted at predetermined times to have its communication with the atmosphere closed whereby said suction head may grip the cover, and mechanical means actuated in timed relation to the suction head to grip and hold open the cover when released by the suction head.

6. A machine for placing covers on bottles, comprising a bottle carrier, a magazine for collapsed covers, a reciprocable suction head having a source of suction normally in communication with the atmosphere and adapted to remove covers from said magazine, forming arms adapted to engage the cover held by said suction head and coöperate therewith in opening the cover, gripping arms adapted to grip and hold the cover open when released by said suction head, means for operating said forming and gripping arms in timed relation to said suction head, and means actuated by a bottle on said carrier adapted to control the suction operation of said suction head.

7. A machine for placing covers on bottles, comprising a bottle carrier, a magazine for collapsed covers, a reciprocable suction head adapted to remove covers from said magazine, formers adapted to engage a cover held by said suction head and coöperate therewith in opening the cover, grippers adapted to grip and hold open a cover when released by said suction head, means for operating said formers and grippers in timed relation to said suction head, and means actuated by a bottle on said carrier adapted to control the suction operation of said suction head.

8. A machine for placing covers on bottles, comprising a bottle carrier, a magazine for collapsed covers, means for moving covers in said magazine, a reciprocable suction head having its source of suction normally in communication with the atmosphere, an atmospheric valve for said suction, formers adapted to engage a cover held by said suction head and coöperate therewith in opening a cover, grippers adapted to grip and hold open a cover when released by said suction head, means for operating said formers and grippers in timed relation to said suction head, and means actuated by a bottle on said carrier adapted to control the suction operation of said suction head through the medium of said atmospheric valve.

9. A machine for placing covers on bottles comprising a trough, means for moving bottles through said trough, a magazine above said trough for collapsed covers, a reciprocable suction head adapted to remove covers from said magazine, a source of suction for said suction head, an atmospheric valve controlling the exhaust of said suction head, means actuated by a bottle in said trough for controlling the operation of said atmospheric valve, and mechanical means operated in timed relation to said suction head adapted to coöperate therewith in opening and placing a cover upon a bottle in said trough.

10. A machine for placing covers on bottles, comprising bottle positioning means, a magazine for covers, mechanical and pneumatic means adapted for removing a cover from said magazine and placing it on a bottle positioned by said positioning means, means including cams adapted for operating the mechanical and pneumatic means in timed relation to said bottle positioning means, a controlling means for the pneumatic portion of said mechanical and pneumatic means governed by the positioning of a bottle, and means governed by one of said cams for locking said controlling means until a predetermined period in the cycle of machine operations.

In testimony whereof we affix our signatures in presence of two witnesses.

EMIL LINDERME.
THEODORE G. LINDERME.

Witnesses:
KARL H. BUTLER,
ANNA M. DORR.